US012519230B2

(12) United States Patent
Zhu et al.

(10) Patent No.: US 12,519,230 B2
(45) Date of Patent: Jan. 6, 2026

(54) FREQUENCY-DEPENDENT COUPLER FOR ANTENNA ARRAY POWER SHARING

(71) Applicant: JOHN MEZZALINGUA ASSOCIATES, LLC., Liverpool, NY (US)

(72) Inventors: Jiaqiang Zhu, Baldwinsville, NY (US); Wengang Chen, Jamesville, NY (US)

(73) Assignee: JOHN MEZZALINGUA ASSOCIATES, LLC, Liverpool, NY (US)

( * ) Notice: Subject to any disclaimer, the term of this patent is extended or adjusted under 35 U.S.C. 154(b) by 134 days.

(21) Appl. No.: 18/690,015

(22) PCT Filed: Feb. 1, 2024

(86) PCT No.: PCT/US2024/014079
§ 371 (c)(1),
(2) Date: Mar. 7, 2024

(87) PCT Pub. No.: WO2024/163795
PCT Pub. Date: Aug. 8, 2024

(65) Prior Publication Data

US 2024/0429605 A1 Dec. 26, 2024

Related U.S. Application Data

(60) Provisional application No. 63/482,602, filed on Feb. 1, 2023.

(51) Int. Cl.
*H01Q 5/314* (2015.01)
*H01Q 9/28* (2006.01)
(Continued)

(52) U.S. Cl.
CPC .............. *H01Q 5/314* (2015.01); *H01Q 9/28* (2013.01); *H01Q 19/10* (2013.01); *H01Q 21/30* (2013.01)

(58) Field of Classification Search
CPC .......... H01Q 5/314; H01Q 9/28; H01Q 19/10; H01Q 21/30; H01Q 21/24; H01Q 21/26; H01Q 21/08; H01Q 1/246
See application file for complete search history.

(56) References Cited

U.S. PATENT DOCUMENTS

2008/0088521 A1 4/2008 Le et al.
2009/0156276 A1 6/2009 Rofougaran
(Continued)

*Primary Examiner* — Seokjin Kim
(74) *Attorney, Agent, or Firm* — BRYAN CAVE LEIGHTON PAISNER LLP

(57) ABSTRACT

An antenna array has two columns of dipoles that are configured to radiate distinct signals. The top and bottom row of dipoles have a coupler that splits the power of each column such that each of the two dipoles at top and bottom radiate in both signals at a given power split ratio. The coupler provides for phase compensation so that the two radiated signals are phase aligned across the top and bottom row. Having the power shared at the top and bottom rows shifts the phase center away from the edge of the ground plane of the antenna's reflector. The coupler is configured so that its coupling efficiency is greatest at the lowest frequency and least at its highest frequency. This improves the performance of the antenna array in the low frequencies while preserving antenna diversity between the two radiated signals.

21 Claims, 4 Drawing Sheets

(51) Int. Cl.
*H01Q 19/10* (2006.01)
*H01Q 21/30* (2006.01)

(56) References Cited

U.S. PATENT DOCUMENTS

| | | | | |
|---|---|---|---|---|
| 2016/0013563 | A1* | 1/2016 | Timofeev | H01Q 21/22<br>343/853 |
| 2020/0169002 | A1 | 5/2020 | Waldauer et al. | |
| 2020/0328533 | A1 | 10/2020 | Sundararajan | |
| 2021/0029556 | A1* | 1/2021 | Wu | H01Q 19/106 |
| 2022/0116790 | A1* | 4/2022 | Firouzbakht | H01Q 5/307 |
| 2023/0238707 | A1* | 7/2023 | Wu | H01Q 21/24<br>343/702 |
| 2024/0186699 | A1* | 6/2024 | Noghanian | H01Q 3/36 |
| 2024/0291137 | A1* | 8/2024 | Kasani | H01Q 3/36 |

* cited by examiner

FREQUENCY-DEPENDENT COUPLER FOR ANTENNA ARRAY POWER SHARING

CROSS-REFERENCE TO RELATED APPLICATIONS

This application is a National Stage Application of International Application No. PCT/US24/14079 filed on Feb. 1, 2024, which claims the benefit of U.S. Provisional Application No. 63/482,602, filed on Feb. 1, 2023, all of which are incorporated by reference in their entirety herein.

BACKGROUND OF THE INVENTION

Multiport and multiband antennas have seen a steady increase in demand and complexity. The current demand from the industry is for multiband antennas that operate in the low band (LB) (617-860 MHz), mid band (MB) (1695-2690 MHz), C-Band and CBRS (Citizens Broadband Radio Service) (3.4-4.2 GHZ). For each of these bands, antennas are required to operate with multiple signals. In the case of the low band, a common design requirement is for the antenna to have four dedicated ports, whereby the antenna may be configured with two independent columns of LB radiators, with each LB radiator configured to transmit and receive two independent signals, each at a different polarization (e.g., ±45 degrees). Further complicating this is the demand that the multiband antenna be as narrow as possible to minimize wind loading.

FIG. 1 illustrates a four-port LB array 100 in a multiband antenna. LB array 100 has a reflector 105 on which are disposed two columns (two linear arrays) of LB radiators 110. Each column of LB radiators is fed two RF (Radio Frequency) signals, one per polarization. In the illustrated example, the left column of LB dipoles 110 is fed two RF signals, from ports 115*a* and 115*b*; and the right column of LB dipoles 110 is fed two RF signals, from powers 120*a* and 120*b*. Each column of LB radiators 110 has a phase center 132 or 135. In a typical antenna design, the space between the two columns of LB dipoles 110 may be reserved for subarrays of MB and/or C-Band dipoles (not shown) that may be disposed on reflector 105. Also not shown in FIG. 1 is a phase shifter or Remote Electrical Tilt (RET) mechanism that provides differential phasing to the LB dipoles 110 in each column to provide for tilting of the radiated beam in the vertical plane. The RET mechanism is omitted herein for simplifying the diagram as it is not pertinent to the description of antenna array 100.

As mentioned earlier, there is demand to reduce the width of reflector 105 to make the antenna as narrow as possible to mitigate wind loading. In response, a distance 160 from the outer edge of reflector 105 to phase center 135 may be narrow to where it affects the gain pattern of the LB dipoles 110.

Accordingly, what is needed is a multiport LB antenna array that provides for improved performance as well as a narrow reflector.

SUMMARY OF THE INVENTION

An aspect of the present disclosure involves an antenna array. The antenna array comprises a reflector plate; a first column (e.g., a first linear array) of dipoles disposed on the reflector plate; a second column (e.g., a second linear array) of dipoles disposed on the reflector plate, wherein the first column of dipoles and the second column of dipoles are arranged to form a top row of dipoles and a bottom row of dipoles, where in the dipoles are configured to radiate in a frequency band; a top coupler coupled to a top pair of dipoles in the top row of dipoles; and a bottom coupler coupled to a bottom pair of dipoles in the bottom row of dipoles, wherein a first component of the top coupler and a first component of the bottom coupler are configured to receive a first signal and a second signal, to provide a phase compensation for the first signal and the second signal, and to couple the first signal and the second signal into a first output signal and a second output signal, wherein the first output signal is a mix of the first signal and the second signal at a first power ratio, and the second output signal is a mix of the first signal and the second signal at a second power ratio, wherein a second component of the top coupler and a second component of the bottom coupler are configured to receive a third signal and a fourth signal, to provide a phase compensation for the third signal and the fourth signal, and to couple the third signal and the fourth signal into a third output signal and a fourth output signal, wherein the third output signal is a mix of the third signal and the fourth signal at a third power ratio, and the fourth output signal is a mix of the third signal and the fourth signal at a fourth power ratio. The top coupler and the bottom coupler are configured to couple the aforementioned receive signals at a first efficiency corresponding to a low frequency of the frequency band and at a second efficiency corresponding to a high frequency of the frequency band. It should be noted that the terms "top" and "bottom" are used for ease of discussion and are not intended to reflect a relative vertical position. One skilled in the art would recognize that the term "top" and "bottom" could be easily be replaced with "first" and "second," respectively, of "left" and "right."

DETAILED DESCRIPTION OF THE INVENTION

Figure 1:
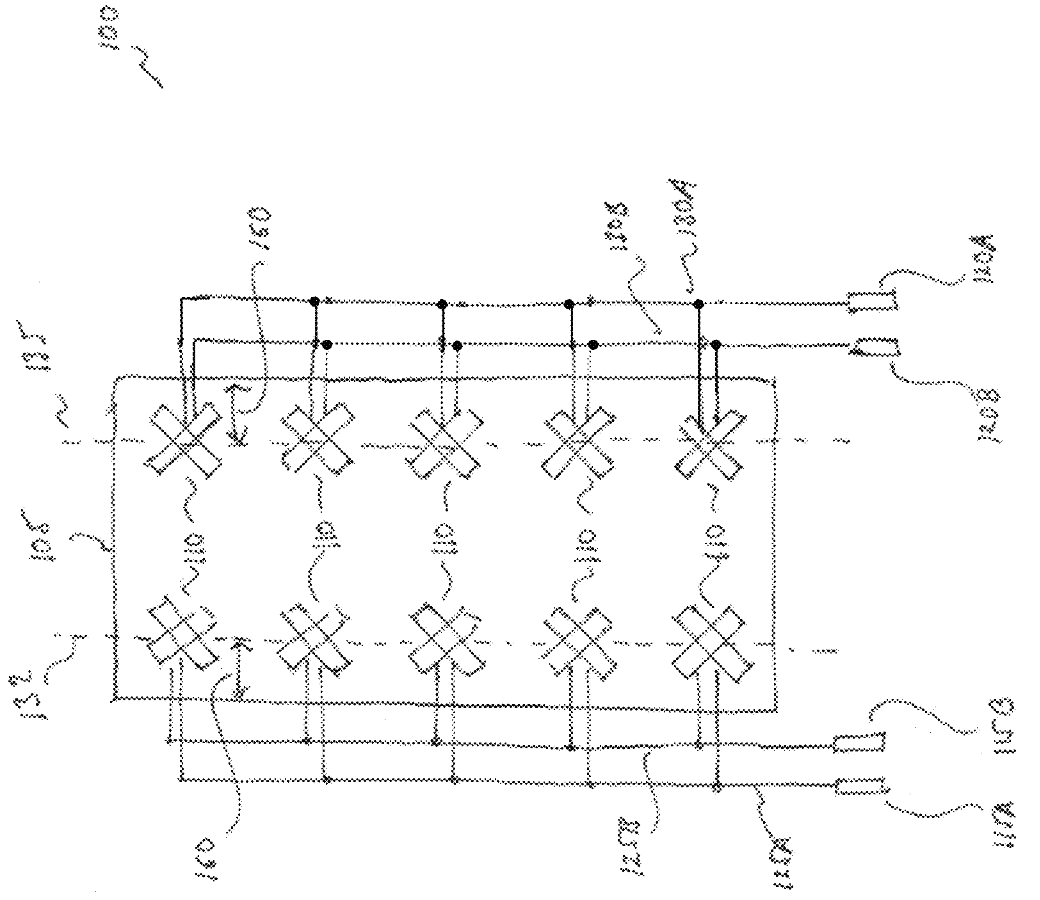
FIG. 1 illustrates a conventional multiport LB antenna array.
Figure 2:
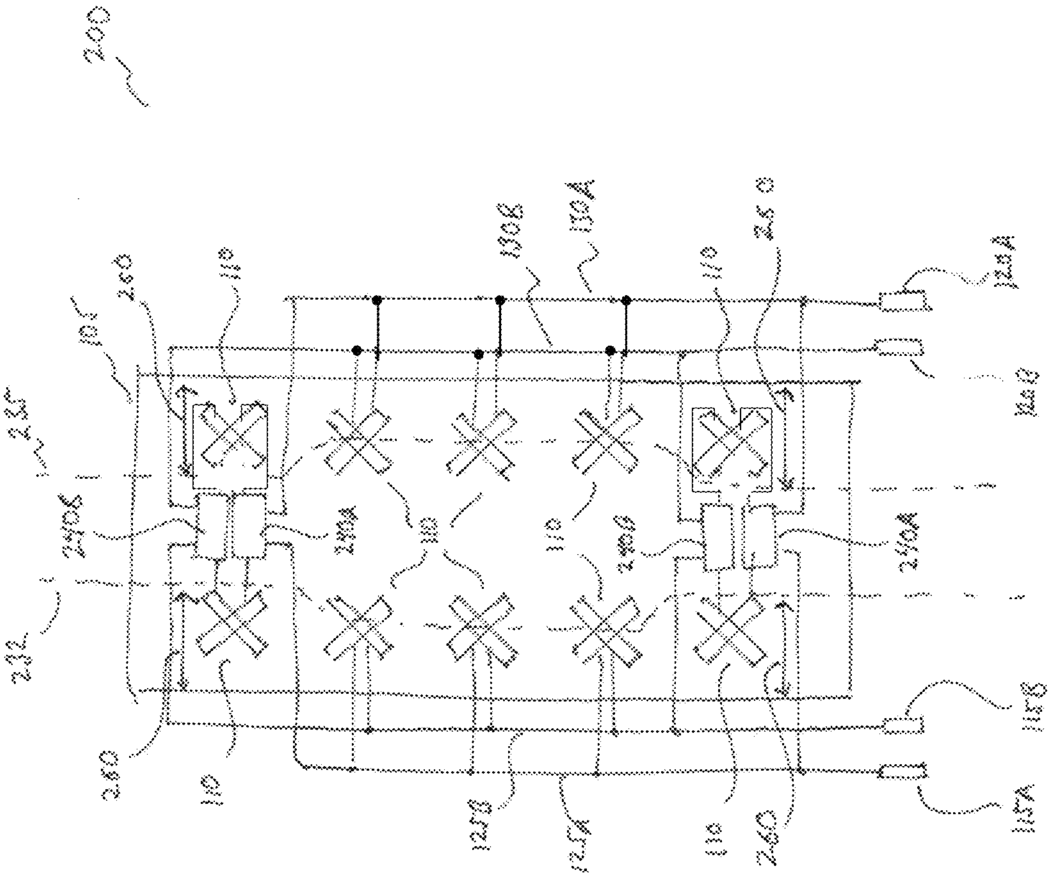
FIG. 2 illustrates an exemplary multiport LB antenna array according to the disclosure.

FIG. 2 illustrates an exemplary multiport LB antenna array 200 according to the disclosure. Antenna array 200 has a reflector 105 and two columns (e.g., two linear arrays) of LB dipoles 110, each of which is configured to radiate two independent signals, each at a different orthogonal polarization (e.g., ±45 degrees). Accordingly, four ports provide signals to the exemplary LB antenna array 200. Reflector 105 and dipoles 110 may be substantially similar to those described above with respect to antenna array 100.

Not shown in FIG. 2 is a phase shifter or Remote Electrical Tilt (RET) mechanism that provides differential phasing to the LB dipoles 110 in each column to provide for tilting of the radiated beam in the vertical plane. The RET mechanism is omitted herein for simplifying the diagram as it is not pertinent to the description of exemplary antenna array 200. It will be understood how a RET mechanism would be integrated into the illustrated antenna array 200.

Antenna array 200 has four ports: ports 115*a* and 115*b* that feed RF signals to the left column of LB dipoles 110, one per polarization, respectively via signal cables or traces 125*a* and 125*b*; and ports 120*a* and 120*b* that feed RF signals to the right column of LB dipoles 110, one per polarization, respectively via signal cables or traces 130*a* and 130*b*. Signal cables or traces (for the sake of brevity, the term cable is used hereon) 125*a*, 125*b*, 130*a*, and 130*b* may have two conductors, one for its corresponding RF signal and one for its ground.

As illustrated, the middle three rows of LB dipoles 110 of each column couple directly to their respective ports (again, neglecting for the sake of brevity any intervening RET mechanism). It will be understood that more or less than three middle rows of LB dipoles is within the scope of the present disclosure. However, the uppermost LB dipoles 110 of both columns are coupled to the ports via dual couplers 240*a* and 240*b* such that, for the polarization corresponding to ports 115*a* and 120*a* (e.g., +45 degrees), their respective cables 125*a* and 130*a* couple to dual coupler 240*a*, and for the polarization corresponding to ports 115*b* and 120*b* (e.g., −45 degrees), their respective cables 125*b* and 130*b* couple to dual coupler 240*b*. Dual coupler 240*a* has two outputs. Dual coupler 240*a* is more broadly referred to as a first component of the top and bottom coupler in the Summary of the Invention section above. One couples to the first polarization (+45) radiators of uppermost LB dipole 110 of the left column and the other couples to the first polarization radiators of uppermost LB dipole 110 of the right column. Dual coupler 240*b*, like dual coupler 240*a*, has two outputs. Dual coupler 240*b* is more broadly referred to as a second component of the top and bottom coupler in the Summary of the Invention section above. One couples to the second polarization (−45) radiators of uppermost LB dipole 110 of the left column and the other couples to the second polarization radiators of uppermost LB dipole 110 of the right column. The two bottom LB dipoles 110 are coupled similarly using a second set of dual couplers 240*a* and 240*b*.

Further illustrated in FIG. 2 are phase centers 232 and 235. As illustrated, phase center 232 runs down the center of the middle three LB dipoles 110 of the left radiator column, and phase center 232 shifts toward the center of reflector 105 at the top and bottom LB dipoles 110, due to the use of power sharing between the top and bottom two LB dipoles 110 due to the dual couplers 240*a/b*, as described further below.

Figure 3:
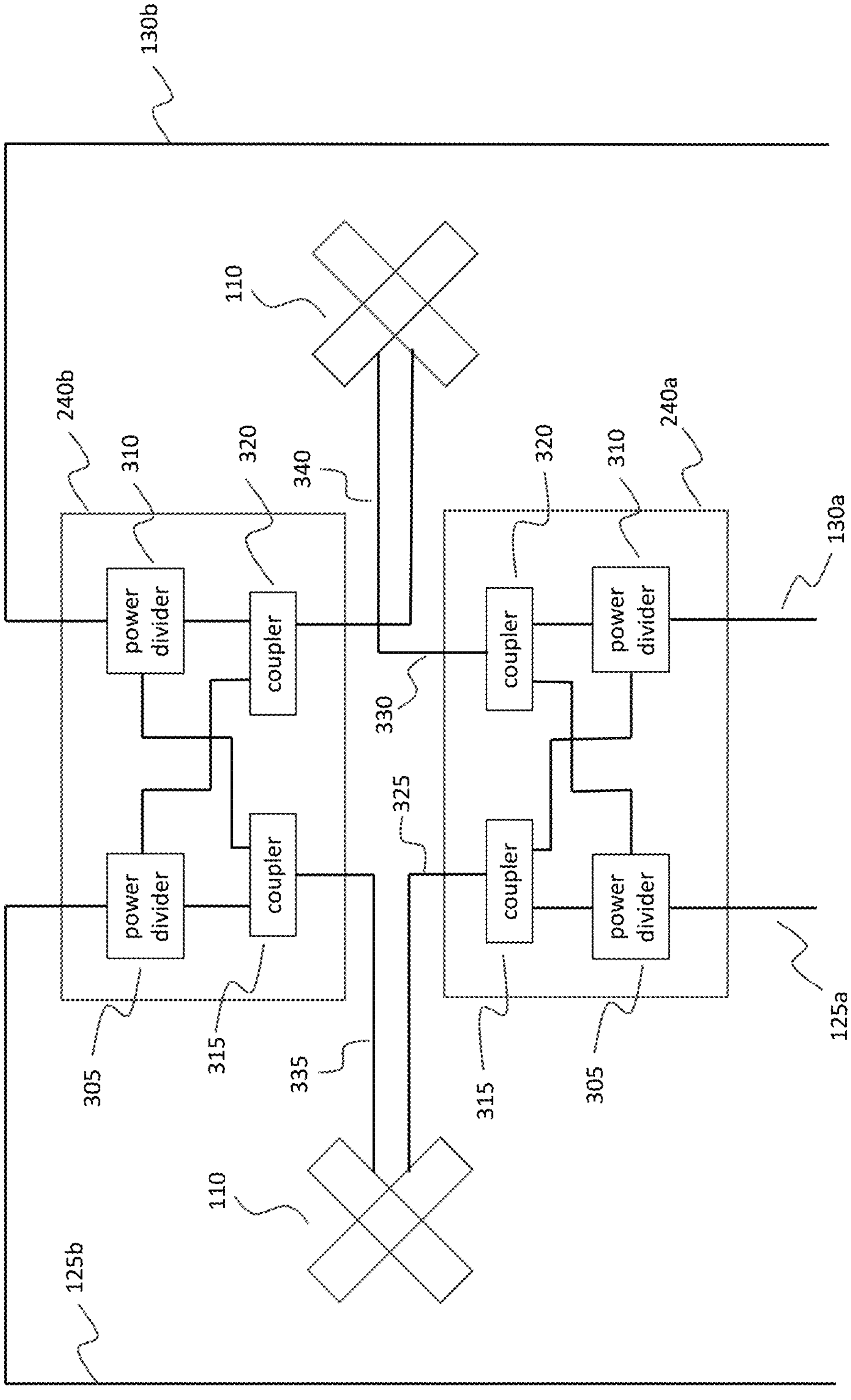
FIG. 3 illustrates an exemplary arrangement of two exemplary couplers as deployed in the upper and lower rows of LB dipoles according to the disclosure.

FIG. 3 illustrates an exemplary arrangement of exemplary dual couplers 240*a* and 240*b* as deployed in the upper and lower rows of LB dipoles 110 according to the disclosure.

Dual coupler 240*a* is coupled to input cables 125*a* and 130*a* that respectively carry corresponding signals to/from ports 115*a* and 120*a*. In the Summary of the Invention section above, these signals are referred to as first and second signals. The signal from cable 125*a* is fed to power divider 305, which also provides for phase compensation (described below). The outputs of power divider 305 are fed to two coupler segments 315 and 320. The signal from cable 130*a* is fed to power divider 310, which also provides for phase compensation. The outputs of power divider 310 are fed to the two coupler segments 315 and 320. Coupler segment 315 has an output 325 that provides the +45 polarized signal to left column LB dipole 110. In the Summary of the Invention section above, this signal is referred to as the first output signal. The signal at output 325 is a phase-aligned sum of signals from ports 115*a* and 120*a* with a power ratio determined by power dividers 305 and 310. Similarly, coupler segment 320 has an output 330 that provides the +45 polarized signal to right column LB dipole 110. In the Summary of the Invention section above, this signal is referred to as the second output signal. The signal at output 330 is a phase-aligned sum of signals from ports 115*a* and 120*a* with a power ratio that is the inverse of the power ratio provided to coupler segment 315.

Dual coupler 240*b* has as input cables 125*b* and 130*b* that respectively carry corresponding signals to/from ports 115*b* and 120*b*. Dual coupler 240*b* is more broadly referred to as a second component of the top and bottom coupler in the Summary of the Invention section above, and the signals to/from ports 115*b* and 120*b* are referred to as third and fourth signals. The signal from cable 125*b* is fed to power divider 305, which also provides for phase compensation (described below). The outputs of power divider 305 are fed to two coupler segments 315 and 320. The signal from cable 130*b* is fed to power divider 310, which also provides for phase compensation. The outputs of power divider 310 are fed to the two coupler segments 315 and 320. Coupler segment 315 has an output 325 that provides the −45 polarized signal to left column LB dipole 110. In the Summary of the Invention section above, this signal is referred to as the third output signal. The signal at output 325 is a phase-aligned sum of signals from ports 115*b* and 120*b* with a power ratio determined by power dividers 305 and 310. Similarly, coupler segment 320 has an output 330 that provides the −45 polarized signal to right column LB dipole 110. In the Summary of the Invention section above, this signal is referred to as the fourth output signal. The signal at output 330 is a phase-aligned sum of signals from ports 115*b* and 120*b* with a power ratio that is the inverse of the power ratio provided to coupler segment 315.

Figure 4:
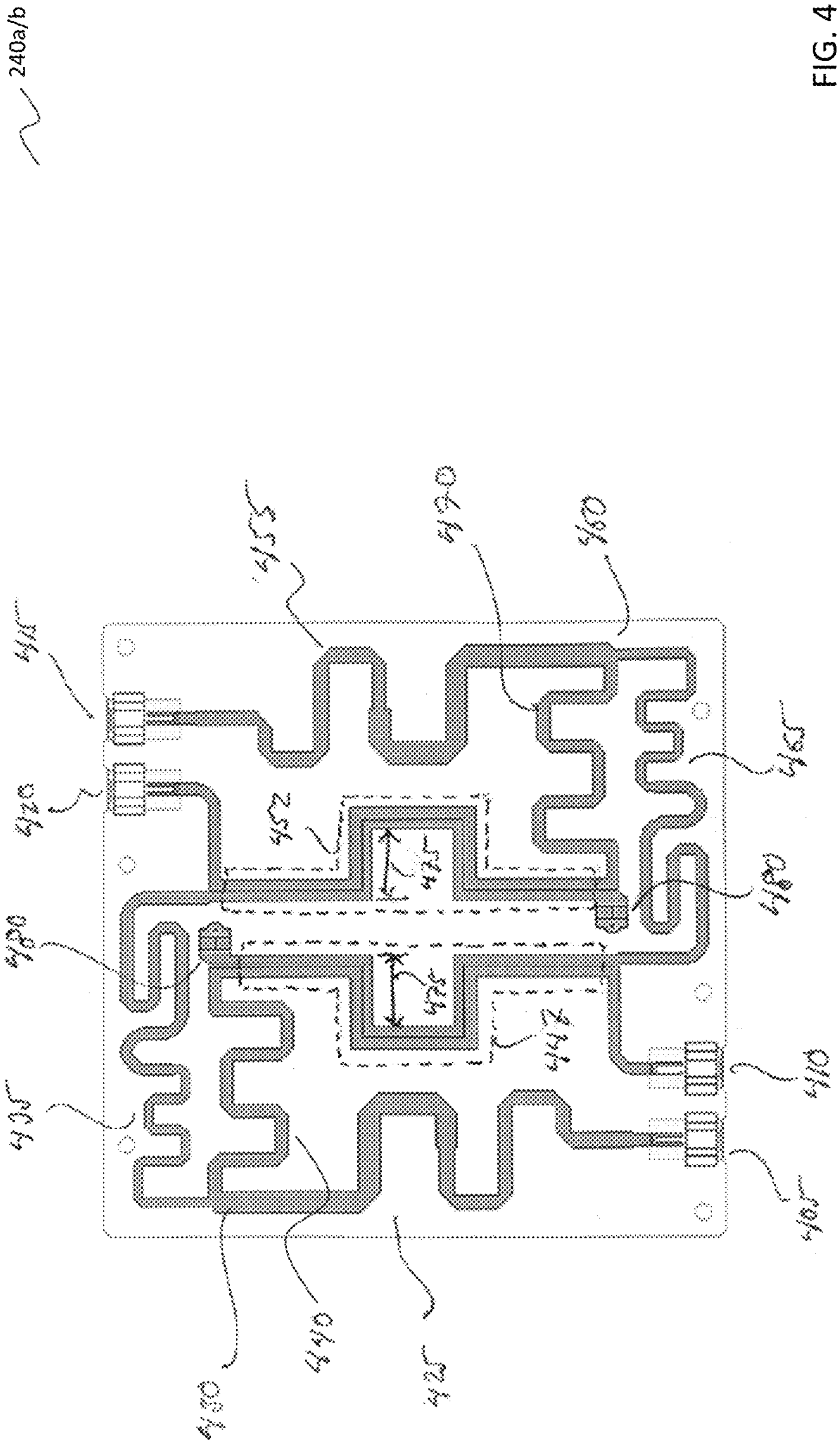
FIG. 4 illustrates an exemplary dual coupler according to the disclosure.

FIG. 4A illustrates an exemplary −15 dB dual coupler 240*a/b* according to the disclosure. Each of dual coupler 240*a* and dual coupler 240*b* has four ports (i.e., two input and two output): first input port 405 that couples to a first signal input (e.g., 125*a/b*); a first output port 410 that couples to one of the polarization elements of one LB dipole 110 (e.g., left column); a second input port 415 that couples to a second signal (e.g., 130*a/b*); and a second output port 420 that couples to the same polarization element but of the other LB dipole 110 (e.g., right column). For purposes of illustration, first input port 405 may correspond to input port 115*a/b*; first output port 410 may correspond to the left LB dipole 110; second input port 415 may correspond to input port 120*a/b*; and second output port 420 may correspond to the right LB dipole 110. It will be understood that this first/second/left/right designation is for the purpose of illustration and that different designations are possible and within the scope of the disclosure.

Coupled to first input port 405 is a left pre-split trace 425, which may have a meander pattern to impart a phase shift to maintain phase alignment between the first and second signals. Left pre-split trace 425 ends at a left power divider 430, which splits left pre-split trace 425 into a left primary split trace 440 and a left secondary split trace 435. Both left primary split trace 440 and left secondary split trace 435 may have further meander patterns for providing phase compensation in conjunction with the meander pattern of left pre-split trace 425.

Left power divider 430 may be designed to split the power of the signal on left pre-split trace 425 into a desired power ratio between the signals respectively present on left primary split trace 440 and left secondary split trace 435. This may be done by designing the respective widths of left primary split trace 440 and left secondary split trace 435 to tailor the power division. For example, a power split ratio of 70/30 may be achieved by setting the width of left primary split trace 440 to an appropriately greater than the width of left secondary split trace 435.

Left primary split trace 440 becomes part of left coupler segment 447 (boundary illustrated by dotted line) and forms an output of left coupler segment 447 that couples to first output port 410. Left secondary split trace 435 becomes part of right coupler segment 452 (boundary illustrated by dotted line) and terminates at a load 480 at the end of right coupler segment 452.

Coupled to second input port 415 is a right pre-split trace 455, which may have a meander pattern to impart a phase shift to maintain phase alignment between the first and second signals. Right pre-split trace 455 ends at a right power divider 460, which splits right pre-split trace 455 into a right primary split trace 470 and a right secondary split trace 465. Both right primary split trace 470 and right secondary split trace 465 may have further meander patterns for providing phase compensation, in conjunction with the meander pattern of right pre-split trace 455.

Right power divider 460 may be designed to split the power of the signal on right pre-split trace 425 into a desired power ratio between the signals respectively present on right primary split trace 470 and right secondary split trace 465. This may be done by designing the respective widths of right primary split trace 470 and right secondary split trace 465 to tailor the power division. For example, a power split ratio of 70/30 may be achieved by setting the width of right primary split trace 470 appropriately greater than the width of right secondary split trace 465.

Accordingly, the signal at first output port 410 is a 70/30 sum of the signal at first input port 405 and second input port 415, respectively; and the signal at second output port 420 is a 70/30 sum of the signal at second input port 415 and first input port 405, respectively.

Right primary split trace 470 becomes part of right coupler segment 452 (boundary illustrated by dotted line) and forms an output of left coupler segment 452 that couples to second output port 420. Right secondary split trace 465 becomes part of left coupler segment 447 and terminates at a load 480 at the end of left coupler segment 447.

In addition to controlling the power split ratio (e.g. 70/30) by the relative widths of left power divider 430 and right power divider 460, the coupling power imparted at left coupler segment 447 and right coupler segment 452 may be controlled through the width of the gap (not shown) between left primary split trace 440 and right secondary split trace 465 within left coupler segment 447, and through the width of the gap (also not shown) between right primary split trace 470 and left secondary split trace 435 within right coupler segment 452.

Another feature of left coupler segment 447 and right coupler segment 452 is a lateral translation 475 that extends the length of the traces respectively within left coupler segment 447 and right coupler segment 452. The length of lateral translation 475 may determine the phase taper of dual coupler 240*a/b* such that the efficiency of the coupling may be higher at the low frequency end of the Low Band than at the high frequency end.

Exemplary dual coupler 240*a/b* illustrated in FIG. 4A may provide −15 dB coupling at 600 MHz and −22 dB coupling at 860 MHz. The coupling may be controlled through the relative thicknesses of first left primary split trace 440 and left secondary split trace 435, and by the conjugate relative thicknesses of right primary split trace 470 and right secondary split trace 465. Designing dual coupler 240*a/b* so that it is a −17 dB coupler at 600 MHZ) may be done either by making left and right primary split traces 440/470 thinner than for the −15 dB coupler, making left and right secondary split traces 435/465 thicker, increasing the gap (not shown) between the traces within coupler segments 447/452, or some combination of the above. 435 This provides advantages. For example, a higher coupling at the low end (600 MHZ) increases the efficiency of the power sharing between the left and right LB dipoles 110, effectively shifting phase center 232 to the right and phase center 235 to the left. This increases the distance 260 between phase center 232 and the left edge of the ground plane of reflector 105, improving the gain profile generated by the left column of LB dipoles 110; and it increases the phase distance 260 between phase center 235 and the right edge of the ground plane of reflector 105, improving the gain profile generated by the right column of LB dipoles 110.

Accordingly, having efficient coupling at the low end of the low band (e.g., 600 MHZ) shifts the phase center away from the edge of the ground plane of reflector 105, which solves a problem disproportionately suffered at the low end of the low band. At the high end of the low band (e.g., 860 MHz), the distance 260 from phase center to the edge of the ground plane is not a problem. However, having less efficient coupling (e.g., −22 dB) at the high end of the low band (e.g., 860 MHz) helps preserve diversity of LB array 200 by maintaining isolation between the signal fed to input port 115*a* and the signal fed to input port 120*a* (and similarly to 115*b* and 120*b*). Otherwise, if the coupling efficiency were maintained constant at −15 dB, the two signals would mix between left and right columns of LB dipoles 110 such that antenna diversity would be undermined. Exemplary antenna array 200 may have improved performance by having dual couplers 240*a/b* and the top and bottom rows of LB dipoles 110, whereby the improved beam pattern at the top and bottom rows, due to shifting phase centers 232 and 235 toward the center of reflector 105, improves the overall beam pattern of both the left and right columns of LB dipoles while maintaining isolation between the left and right columns to preserve diversity.

The invention claimed is:

1. An antenna array, comprising:

a reflector plate;

a first column of dipoles disposed on the reflector plate;

a second column of dipoles disposed on the reflector plate, wherein the first column of dipoles and the second column of dipoles are arranged to form a top row of dipoles and a bottom row of dipoles, wherein the dipoles are configured to radiate in a frequency band;

a top coupler coupled to a top pair of dipoles in the top row of dipoles; and a bottom coupler coupled to a bottom pair of dipoles in the bottom row of dipoles, wherein each of the top coupler and the bottom coupler comprises a first coupling component and a second coupling component, wherein each coupling component is configured to receive a first signal and a second signal, to provide a phase compensation for the first signal and the second signal, and to couple the first signal and the second signal into a first output signal and a second output signal, wherein the first output signal is a mix of the first signal and the second signal at a first power ratio, and the second output signal is a mix of the first signal and the second signal at a second power ratio, wherein the first and second coupling components of the top coupler and the bottom coupler are configured to couple the first signal and the second signal at a first efficiency corresponding to a low frequency of the frequency band and at a second efficiency corresponding to a high frequency of the frequency band.

2. The antenna array of claim 1, wherein the first efficiency is higher than the second efficiency.

3. The antenna array of claim 2, wherein the first efficiency is −15 dB.

4. The antenna array of claim 1, wherein the first power ratio is an inverse of the second power ratio.

5. The antenna array of claim 4, wherein the first power ratio is 70/30.

6. The antenna array of claim 1, wherein each of the first and the second components of the top coupler and the bottom coupler comprises:

a first signal path coupled to a first input port, the first signal path having a first meander pattern, a first power divider, and a first primary split path and a first secondary split path, the first primary split path coupled to a first coupler segment and the first secondary split path coupled to a second coupler segment;

a second signal path coupled to a second input port, the second signal path having a second meander pattern, a second power divider, and a second primary split path and a second secondary split path, the second primary split path coupled to the second coupler segment and the second secondary split path coupled to the first coupler segment;

a first output port coupled to the first coupler segment; and a second output port coupled to the second coupler segment.

7. The antenna array of claim 6, wherein the first power divider is configured to divide a signal from the first input port between the first primary split trace and the first secondary spit trace according to the first power ratio.

8. An antenna array comprising:

a first linear array of antenna dipoles;

a second linear array of antenna dipoles, wherein the antenna dipoles of the first and second linear arrays transmit within a frequency band;

a coupler connecting a first antenna dipole of the first linear array and a first antenna dipole of the second linear array, the coupler comprising a plurality of input ports, each configured to receive a corresponding one of a plurality of input signals, and a plurality of output ports, each configured to output a corresponding one of a plurality of output signals, wherein the first antenna dipole of the first linear array together with the first antenna dipole of the second linear array are configured to receive the plurality of output signals, and wherein the coupler is configured to phase compensate the plurality of input signals, divide each of the plurality of input signals, and couple the divided input signal of each of the plurality of input signals with a divided input signal of another one of the plurality of input signals such that each of the plurality of output signals has a desired power ratio.

9. The antenna array of claim 8, wherein each of the antenna dipoles of the first linear array forms an antenna dipole row with a corresponding one of the antenna dipoles of the second linear array.

10. The antenna array of claim 9, wherein the first antenna dipole of the first linear array and the first antenna dipole of the second linear array form a first antenna dipole row at a first end of the first and second linear arrays.

11. The antenna array of claim 10, wherein a second antenna dipole of the first linear array and a second antenna dipole of the second linear array form a second antenna dipole row at a second end of the first and second linear arrays.

12. The antenna array of claim 11, wherein the first linear array further comprises a third antenna dipole positioned between the first and second antenna dipoles of the first linear array, wherein the second linear array further comprises a third antenna dipole positioned between the first and second antenna dipoles of the second linear array, and wherein the third antenna dipole of the first linear array and the third antenna dipole of the second linear array form a middle antenna dipole row between the first and second antenna dipole rows located at the first and second ends of the first and second linear arrays, respectively.

13. The antenna array of claim 12 further comprising:

a second coupler connecting the second antenna dipole of the first linear array and the second antenna dipole of the second linear array, the second coupler comprising a plurality of input ports, each configured to receive a corresponding one of the plurality of input signals, and a plurality of output ports, each configured to output a corresponding one of a second plurality of output signals, wherein the second antenna dipole of the first linear array together with the second antenna dipole of the second linear array are configured to receive the plurality of second output signals, and wherein the second coupler is configured to phase compensate the plurality of input signals, divide each of the plurality of input signals, and couple the divided input signal of each of the plurality of input signals with a divided input signal of another one of the plurality of input signals such that each of the plurality of second output signals has a desired power ratio.

14. The antenna array of claim 13, wherein the first coupler and the second coupler are dual couplers, each comprising a first coupling component and a second coupling component, wherein the first coupling component, of both the first and second couplers, comprises first and second input ports and first and second output ports, and the second coupling component, of both the first and second couplers, comprises third and fourth input ports and third and fourth output ports, wherein the first antenna dipole of the first linear array receives a first and third output signal associated with the first and third output ports, respectively, of the first coupler, and the first antenna dipole of the second linear array receives a second and fourth output signal associated with the second and fourth output ports, respectively, of the first coupler, and wherein the second antenna dipole of the first linear array receives a first and third output signal associated with the first and third output ports, respectively, of the second coupler, and the second antenna dipole of the second linear array receives a second and fourth output signal associated with the second and fourth output ports, respectively, of the second coupler.

15. The antenna array of claim 14, wherein, the first and second coupling components are configured such that the first and second output signals of the first coupling component, of both the first and second couplers, have a first power ratio and a second power ratio respectively, and the third and fourth output signals of the second coupling component, of both the first and second couplers, have the same first power ratio and second power ratio, respectively.

16. The antenna array of claim 15, wherein the first power ratio is an inverse of the second power ratio.

17. The antenna array of claim 16, wherein the first power ratio is 70/30.

18. The antenna array of claim 13, wherein the first and second coupling components, of both the first and second couplers, are configured to couple the divided input signals at a first efficiency corresponding to a low frequency within the frequency band and at a second efficiency corresponding to a high frequency within the frequency band.

19. The antenna array of claim 18, wherein the first efficiency is −15 dB.

20. The antenna array of claim 13, wherein the third antenna dipole of the first and the second linear array of dipole antennas receive the plurality of input signals without a coupler there between.

21. The antenna array of claim 13, wherein a first phase center associated with the first linear array runs through the third antenna dipole of the first linear array and a second phase center associated with the second linear array runs through the third antenna dipole of the second linear array, and wherein the first and second couplers are configured such that the first and second phase centers are laterally displaced closer to each other between the first and second linear arrays at the first and the second ends of the first and second linear arrays.

* * * * *